United States Patent Office 2,724,710
Patented Nov. 22, 1955

2,724,710

4-PYRIDAZINECARBOXYLIC ACID AND SALTS THEREOF WITH BASES

Robert Duschinsky, Essex Fells, N. J.

No Drawing. Application September 20, 1952,
Serial No. 310,724

6 Claims. (Cl. 260—250)

The present invention relates to 4-pyridazinecarboxylic acid and salts thereof, and to methods of preparing these compounds. The compounds of this invention are useful as bactericides and antimetabolites, for example, they inhibit the utilization of niacin and niacinamide by organisms such as *Lactobacillus arabinosus*.

4-pyridazinecarboxylic acid may be prepared by heating 4,5-pyridazinedicarboxylic acid in an organic nitrogen base at elevated temperatures and for a time sufficient to eliminate one mol of carbon dioxide, preferably by heating in the range of about 150°–160° C. A preferred group of such organic nitrogen bases consists of aniline, dimethyl aniline, and quinoline.

4-pyridazinecarboxylic acid forms salts with bases. The ammonium salt and the alkali metal salts, e. g., the sodium salts, and the alkaline earth metal salts, e. g., the calcium salts, are soluble in water. The silver salt, however, is insoluble in water and may be used to isolate and characterize the acid.

The invention is further disclosed in the following examples, which are illustrative but not limitative.

*Example 1*

A mixture of 2 g. of 4,5-pyridazinedicarboxylic acid and 20 ml. of aniline was refluxed under nitrogen for 25 minutes. The aniline was removed by steam distillation. The aqueous layer was decanted from tarry material and evaporated in vacuo. The residue obtained, upon trituration with 10 ml. of ethanol, became crystalline. The product was filtered off and washed with ethanol and ether. The 4-pyridazinecarboxylic acid was recrystallized from 25 ml. of ethanol and melted with decomposition at 225°–230° C.

In order to characterize the 4-pyridazinecarboxylic acid, the ethyl ester, the carboxamide, and the hydrazide of the acid were prepared as illustrated by the following:

A suspenssion of 5.76 g. of powdered 4-pyridazinecarboxylic acid in 350 ml. of anhydrous ethyl alcohol was stirred and saturated with dry hydrogen chloride while cooling. The stream of hydrogen chloride was stopped and the suspension was then heated to 60° C. A clear solution resulted in ¾ hour but the heating was continued for an additional 15 minutes. The solvent was removed by distillation in vacuo at room temperature and the crystalline residue of the hydrochloride was then neutralized by adding a little crushed ice and 34.5 ml. of 2 N sodium carbonate. The liberated base was extracted three times with 30 ml. portions of ether. After the addition of 11.5 ml. more of 2 N sodium carbonate and 3 more extractions with 30 ml. portions of ether, the combined extracts were dried over sodium sulfate, filtered, and evaporated in vacuo. The ethyl 4-pyridazinecarboxylate crystallized readily upon cooling slightly, but melted at room temperature.

A 200 mg. sample of crude hydrochloride obtained as above was recrystallized by dissolving it in 2 ml. of anhydrous alcohol and precipitating by adding one drop of 9 N alcoholic hydrochloric acid and 8 ml. of ether. It was filtered and washed with ether. The ethyl 4-pyridazinecarboxylate hydrochloride melted at 114°–116° C.

A solution of 3.04 g. of ethyl 4-pyridazinecarboxylate in 10 ml. of anhydrous alcohol was saturated with dry ammonia while cooling. After standing overnight with cooling, the crystallized product was filtered and washed with cold alcohol and ether. The 4-pyridazinecarboxamide was recrystallized from 55 ml. of alcohol, cooled well, and washed with cold alcohol and ether. The amide had a melting point of 190°–192° C.

A solution of 4.6 g. of ethyl 4-pyridazinecarboxylate in 7 ml. of anhydrous alcohol was treated with 3.15 ml. of 17.5 N (85 percent) hydrazine hydrate and heated for 5 minutes on a steam bath. The solution was then cooled. Upon the addition of 20 ml. of anhydrous alcohol, the hydrazide of 4-pyridazinecarboxylic acid crystallized. It was filtered, washed with anhydrous alcohol and ether and then recrystallized from 30 ml. of anhydrous alcohol. The hydrazide melted at 123.5°–124° C.

By treating the hydrazide obtained above with alcoholic hydrochloric acid, a dihydrochloride melting at 185° C. (dec.) was obtained.

*Example 2*

A mixture of 70 g. of 4,5-pyridazinedicarboxylic acid and 300 ml. of dimethylaniline was stirred and heated at 150°–160° C. for 3 hours in a current of nitrogen. The dimethyl aniline was then removel by steam distillation. The aqueous residue was decanted from some tar and cooled to obtain a first crop of crystals. This product was filtered, washed with cold water, then with alcohol and ether. The mother liquor was concentrated to dryness and the residue triturated with 70 ml. of N hydrochloric acid. Upon cooling, a second crop of crystals was obtained. The combined crystal crops were purified by dissolving in 88 ml. of 2.5 N sodium hydroxide, filtering the solution, and acidifying with 44 ml. of 5 N nitric acid. The 4-pyridazinecarboxylic acid crystallized. It was then filtered and washed with water, alcohol and ether, and melted at 236° C. with decomposition.

*Example 3*

A suspension of 0.97 g. of 4,5-pyridazinedicarboxylic acid in 10 ml. of quinoline was heated at 160° C. for 3 hours. The mixture was steam distilled, and the aqueous residue was decanted from tar and evaporated to dryness in vacuo. The residue was triturated with 7 ml. of N hydrochloric acid, filtered and washed with water, alcohol and ether. The crude material was dissolved in 3 ml. of hot water, filtered through charcoal, and then concentrated to a small volume until crystallization began. The 4-pyridazinecarboxylic acid was filtered and washed with water, alcohol and ether; it melted at 235° C. with decomposition.

*Example 4*

6 g. of 4-pyridazinecarboxylic acid was dissolved in 10 ml. of 5 N sodium hydroxide. The sodium salt of 4-pyridazinecarboxyic acid precipitated in the presence of the excess of caustic. Upon the addition of a small amount of water, the precipitate readily dissolved.

The calcium salt of 4-pyridazinecarboxylic acid was similarly prepared by reaction of the acid with calcium hydroxide.

*Example 5*

Silver nitrate was introduced into an aqueous solution of 4-pyridazinecarboxylic acid. A white precipitate formed which was the silver salt of 4-pyridazinecarboxylic acid.

I claim:

1. A compound selected from the group consisting of 4-pyridazinecarboxylic acid and salt thereof formed from bases.
2. 4-pyridazinecarboxylic acid.
3. An alkali metal salt of 4-pyridazinecarboxylic acid.
4. An alkaline earth metal salt of 4-pyridazinecarboxylic acid.
5. A method of producing 4-pyridazinecarboxylic acid which comprises heating 4,5-pyridazinedicarboxylic acid at a temperature in the range of from about 150° to about 160° C. in an organic nitrogen base to eliminate one mol of carbon dioxide from the dicarboxylic acid.
6. A method according to claim 5 wherein the organic nitrogen base is selected from the group consisting of aniline, dimethyl aniline and quinoline.

References Cited in the file of this patent

UNITED STATES PATENTS

| | | |
|---|---|---|
| 2,389,065 | Lee et al. | Nov. 13, 1945 |
| 2,394,650 | Zimmerli | Feb. 12, 1946 |

OTHER REFERENCES

Burk et al.: J. Phys. Chem., vol. 35, pp. 1461–73, (1931).
Ogata et al.: Chem. Abst., vol. 43, col. 7904 (1949).
Hoogewerff et al.: Ber. Deut. Chem. 14, 974 (1881).
Beilstein, Vierte Auflage, vol. 25, p. 125 (1936).
Gabriel et al.: Ber. Deut. Chem. 36, 3374 (1903).
Groggins, Unit Processes of Org. Synthesis, page 477 (1947), McGraw Hill, New York, N. Y.
Baier-Bode: Pyridin und seine Derivate (1935 ed.), p. 213.